F. O. MINER.
GROUND WORKING TOOL.
APPLICATION FILED MAY 3, 1918.
1,303,570.
Patented May 13, 1919.
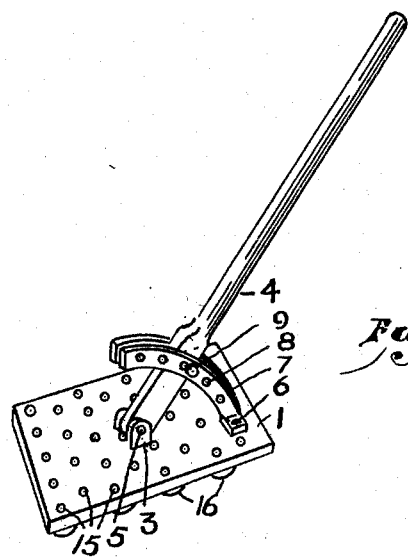
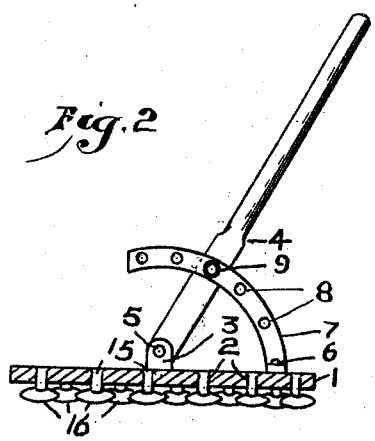
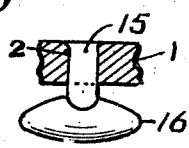
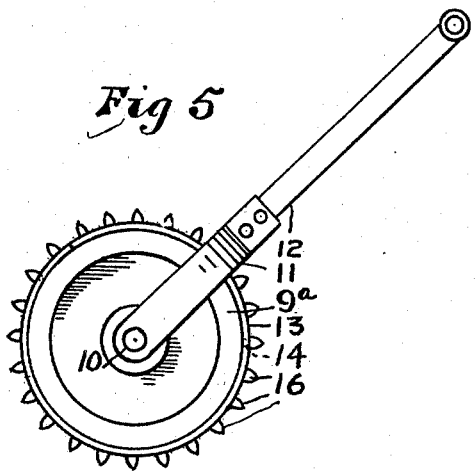
WITNESS
INVENTOR.
Frederick Otto Miner

UNITED STATES PATENT OFFICE.

FREDERICK OTTO MINER, OF CRAFTON, PENNSYLVANIA.

GROUND-WORKING TOOL.

1,303,570. Specification of Letters Patent. Patented May 13, 1919.

Application filed May 3, 1918. Serial No. 232,408.

*To all whom it may concern:*

Be it known that I, FREDERICK OTTO MINER, a citizen of the United States of America, residing at Crafton, in the county of Allegheny and State of Pennsylvania, have invented certain new and useful Improvements in Ground-Working Tools, of which the following is a specification.

This invention relates to ground working tools, and has for its object to provide, in a manner as hereinafter set forth, a tool of such class, having means for indenting the ground when preparing a lawn to provide small cavities for the reception of seed when sowing, particularly grass-seed, under these conditions reducing the blowing away of the sown seed to a minimum, thus preventing waste.

A further object of the invention is to provide a ground working tool, provided in a manner as hereinafter set forth, with teeth for indenting the ground to provide small cavities, the teeth being of such shape as to prevent the cavities filling when the teeth are removed from the ground.

Further objects of the invention are to provide a ground working tool or implement which is simple in its construction and arrangement, strong, durable, efficient in its use, readily set up and comparatively inexpensive to manufacture.

With the foregoing and other objects in view this invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:

Figure 1 is a perspective view of a ground working tool or implement in accordance with this invention.

Fig. 2 is a longitudinal section.

Fig. 3 is an elevation of the tooth.

Fig. 4 is an inverted plan of the tooth.

Fig. 5 is a side elevation of a modified form.

Referring to Figs. 1 and 2, of the drawings 1 denotes the body portion of the tool, which is in the form of a rectangular plate, provided with transverse rows of openings 2.

The upper face of the body portion 1, has a pair of apertured lugs 3, and extending between said lugs 3, is the lower end of an adjustable handle 4. The lower end of the handle 4, is pivotally connected, as at 5, to the lugs 3.

Secured as at 6, to the upper face of the body portion 1, is a pair of sector-shaped arms 7, provided with openings 8. The handle 4, extends between the arms 7, and has an opening adapted to aline with one of the openings 8, whereby a pin 9, can be extended through the alining openings and the handle 4, maintained in adjustable position relative to the body portion 1.

The body portion has secured therewith transverse rows of teeth, and each of the teeth consists of a short shank 15, which has formed integral therewith a head 16, elliptical in longitudinal section and substantially oval in cross-section. The shank is secured in an opening of the body portion and is formed integral with the head centrally thereof. When the teeth are secured to the body portion the heads project therefrom. The rows of teeth are so spaced and arranged that the teeth of one row extend between the teeth of an adjacent row.

Referring to Fig. 5, of the drawing the body portion of the tool or implement is in the form of a roller $9^a$, having pintles 10, journaled in the yoke 11, to which the handle 12 is attached. The body portion $9^a$, has mounted thereon a band 13, having rows of openings 14 in which are secured teeth, arranged in the same manner and performing the same function as the teeth hereinbefore referred to.

The adjustability of the handle 4, permits a proper application of the tool to a terrace.

The form shown in Fig. 1, is used by bringing the body portion in contact with the ground, or in other words, by striking the ground, while the form shown in Fig. 5 is rolled over the ground.

What I claim is:

1. A ground working tool comprising a body portion provided with rows of openings, a shank secured in each of said openings, and a head secured centrally thereof to one end of a shank and projecting from the body portion, each of said heads being elliptical in longitudinal section and substantially oval in cross section.

2. A ground working tool comprising a body portion provided with rows of openings, a shank secured in each of said openings, and a head secured centrally thereof to one end of each of the shanks, each of said heads being elliptical in contour and arranged in close proximity to the body portion, said rows of openings extending transversely of the body portion, and said heads arranged in rows extending transversely of the body portion and with the heads of one row extending between the heads of an adjacent row.

In testimony whereof I affix my signature.

FREDERICK OTTO MINER.